UNITED STATES PATENT OFFICE.

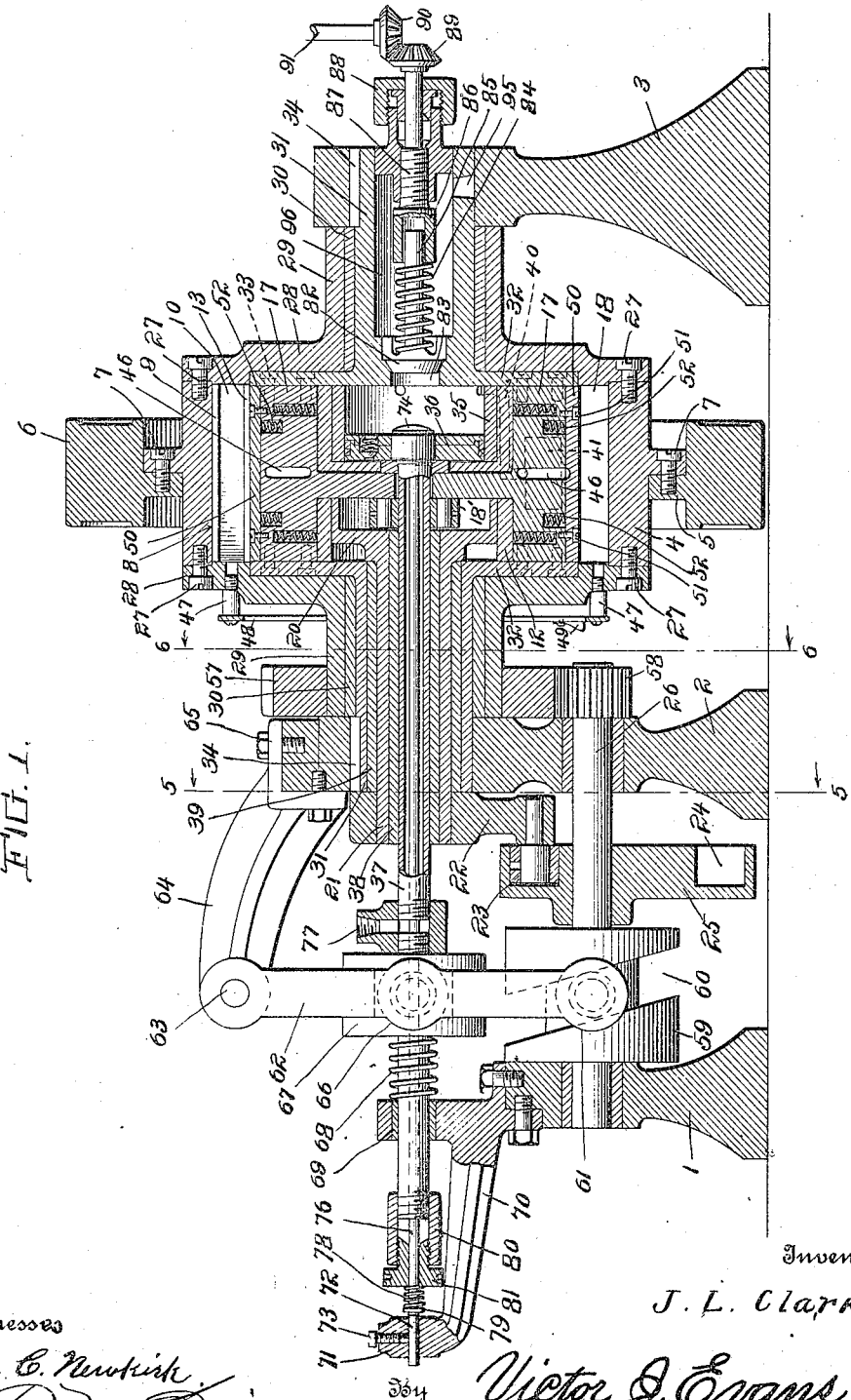

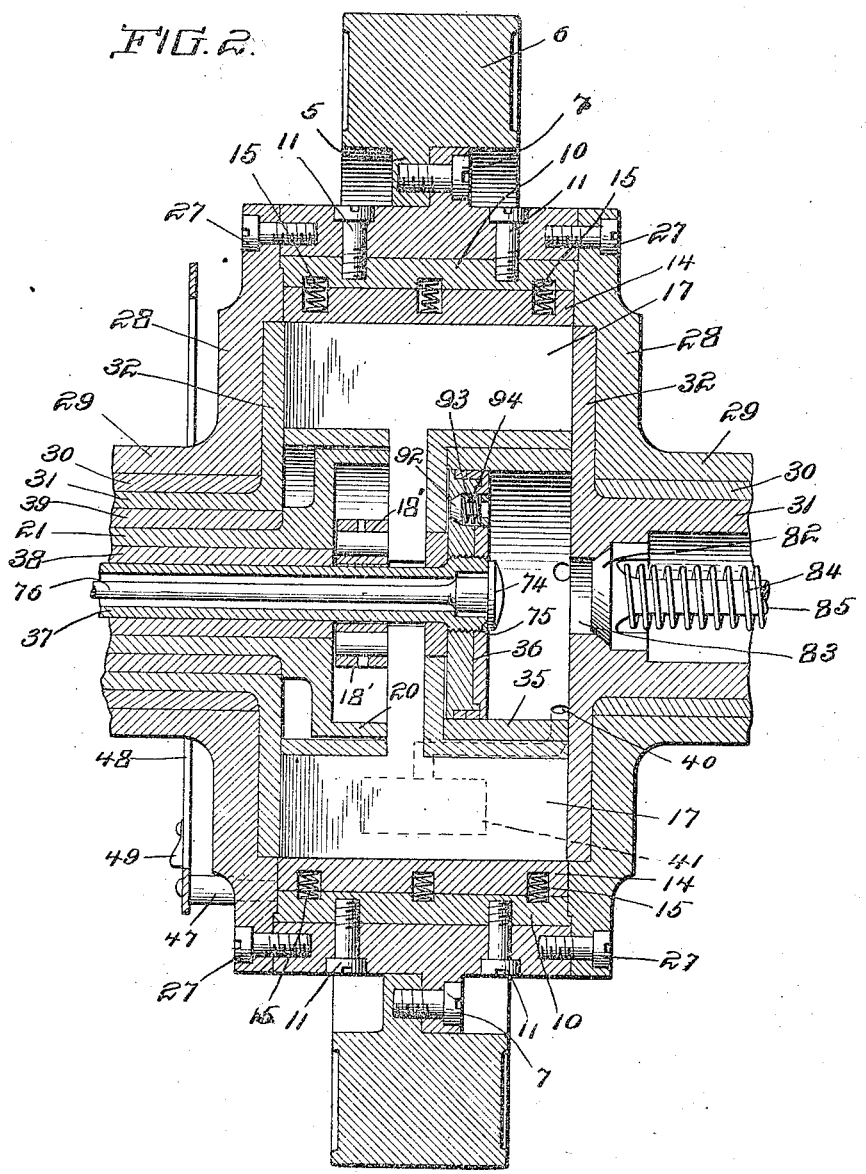

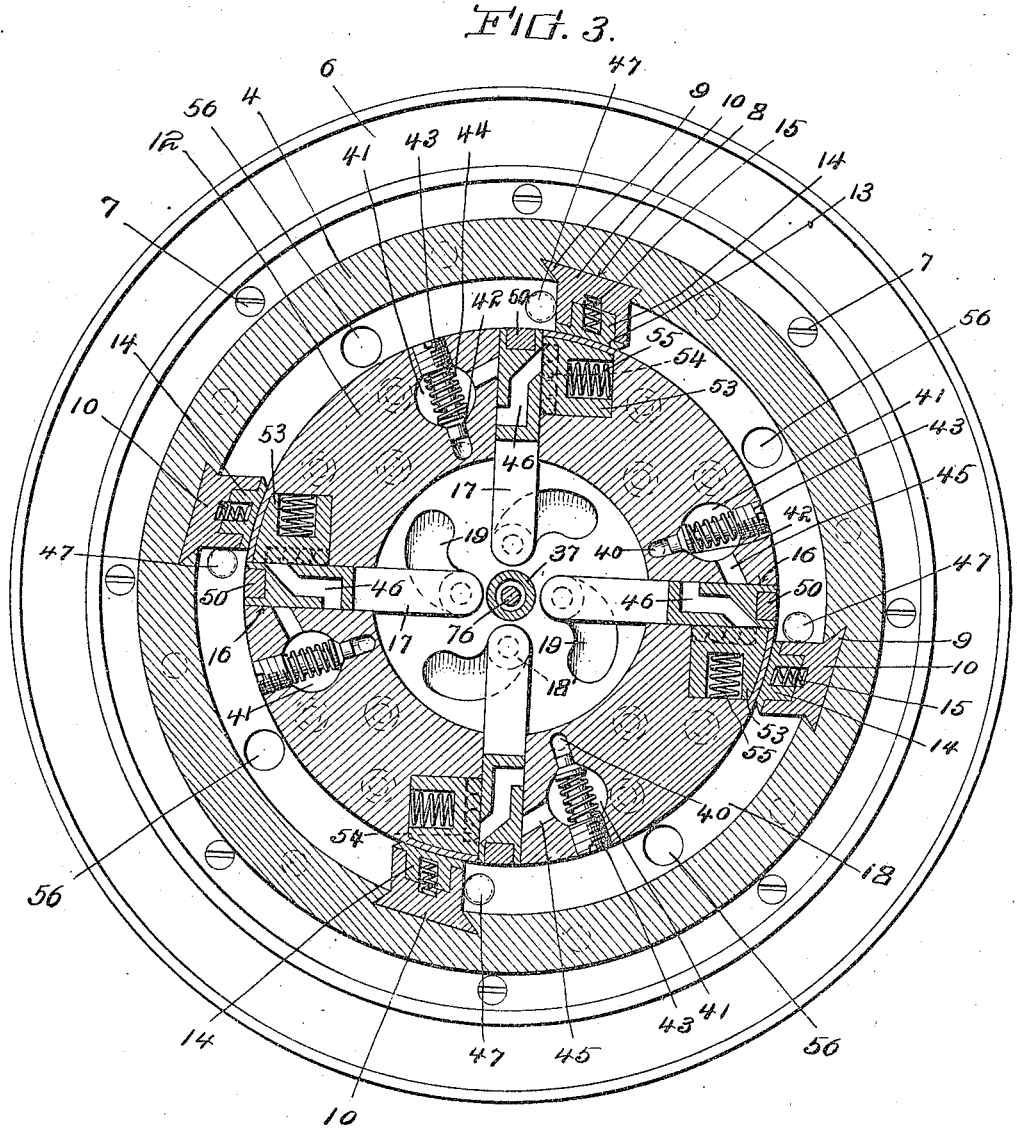

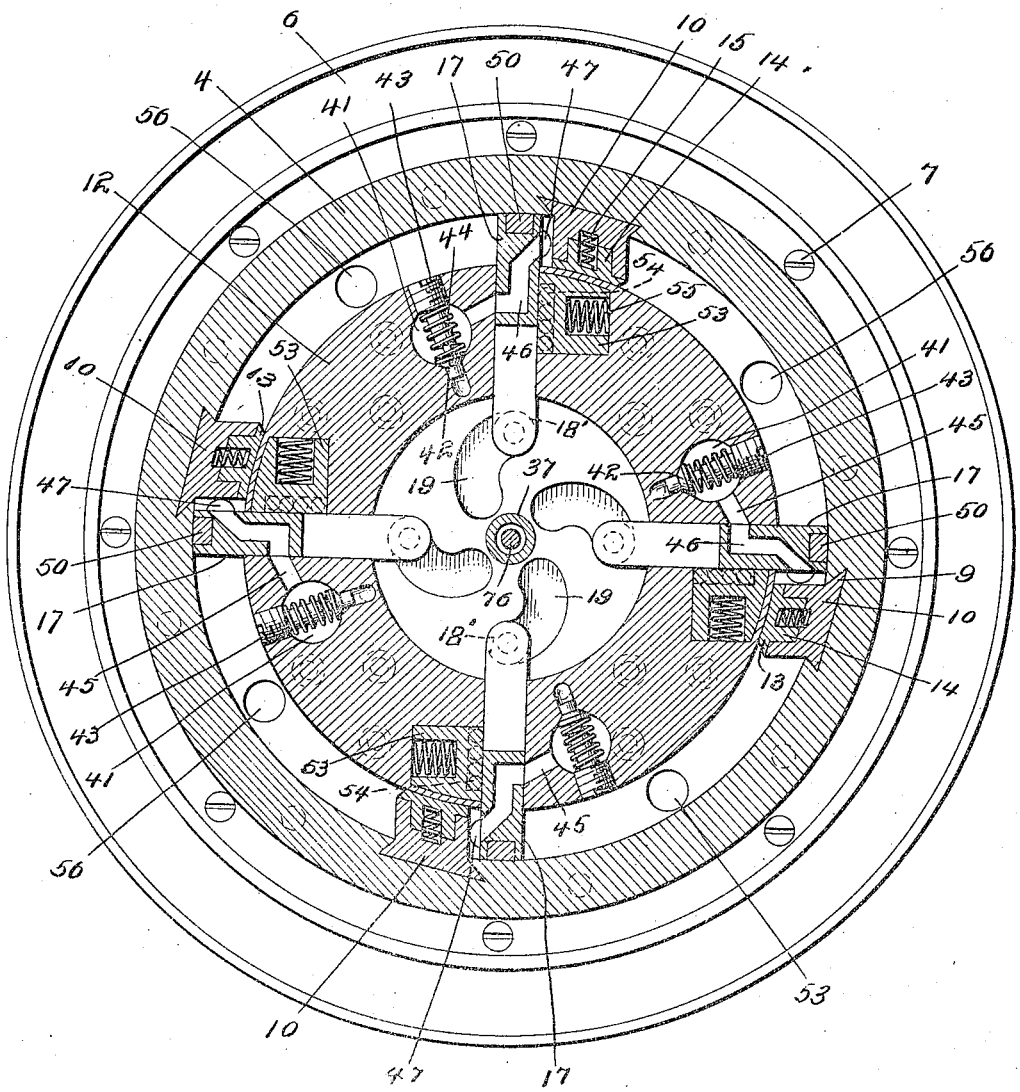

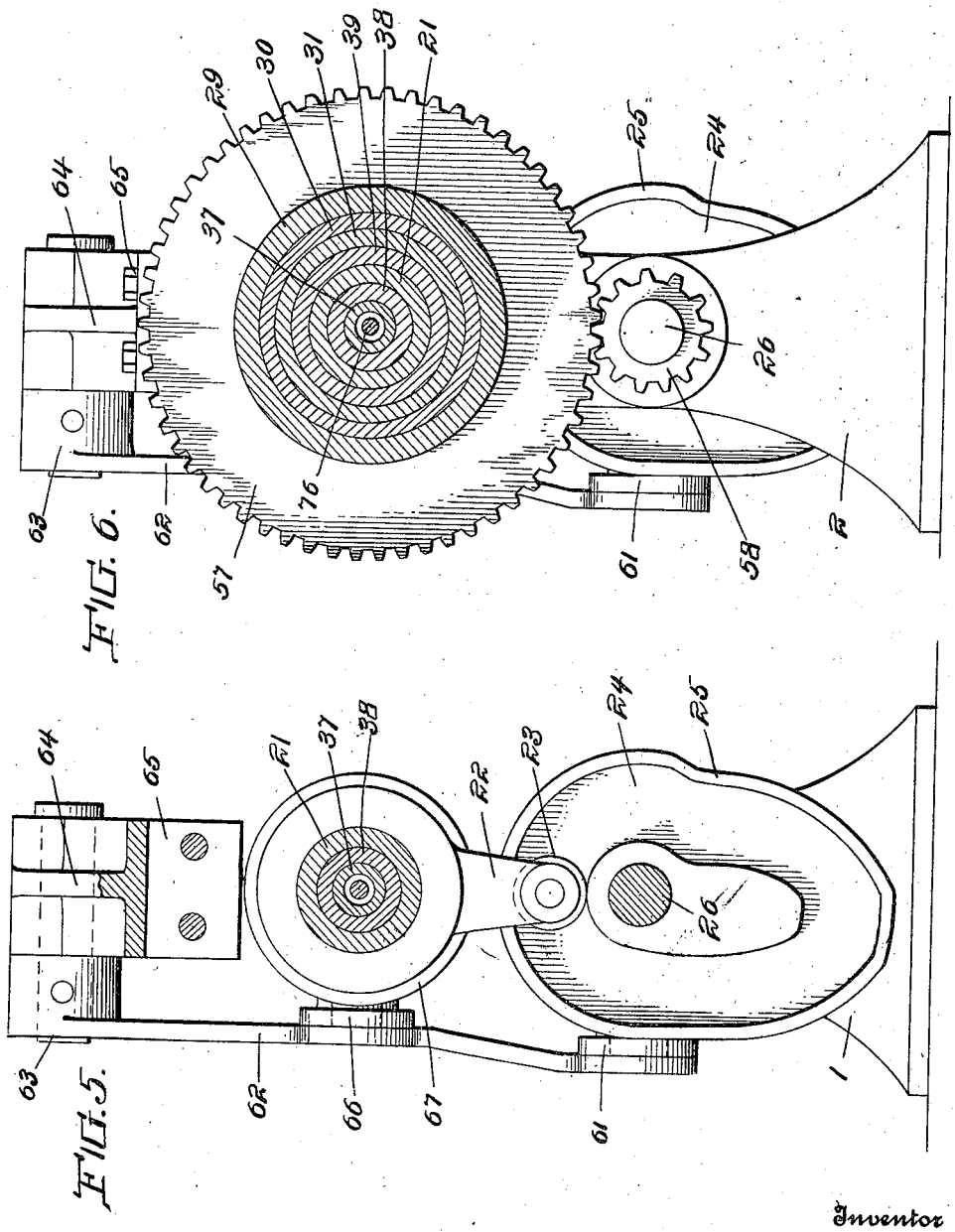

JOHN L. CLARK, OF LOCKPORT, ILLINOIS, ASSIGNOR OF ONE-FIFTH TO EDWIN F. MANDELL, OF CHICAGO, ILLINOIS.

ROTARY INTERNAL-COMBUSTION ENGINE.

1,170,415.

Specification of Letters Patent. Patented Feb. 1, 1916.

Application filed September 8, 1915. Serial No. 49,577.

*To all whom it may concern:*

Be it known that I, JOHN L. CLARK, a citizen of the United States, residing at Lockport, in the county of Will and State of Illinois, have invented new and useful Improvements in Rotary Internal-Combustion Engines, of which the following is a specification.

This invention relates to rotary internal combustion engines, the object in view being to produce a reliable and practical engine of the type referred to by means of which a plurality of explosions or impulses are imparted to the rotor in each complete revolution of the latter, at the same time avoiding any possibility of back firing.

A further object of the invention is to provide a novel combination and arrangement of rotor and stationary or non-rotary member which is encircled by the rotor, the said stationary or non-rotary member carrying a series of slidable abutments, the latter operating as cut-offs or valves controlling the movement of the mixture under compression to the combustion chamber or chambers comprised between the non-rotating abutments and other abutments which are carried by the rotor.

A further object of the invention is to provide novel means for compressing the mixture before it is admitted to the combustion chambers; also to provide storage or trapping chambers in which the compressed mixture is confined preparatory to the delivery thereof to the combustion chamber or chambers.

A further object of the invention is to provide novel operating means for the admission or inlet valve which is carried by the mixture compressing piston, the said parts being located centrally within the non-rotary or stationary member referred to.

A further object of the invention is to provide simple means in the form of an oscillatory cam together with operating means therefor, whereby the slidable abutments are actuated outwardly and inwardly in a positive manner.

With the above and other objects in view, the invention consists in the novel construction, combination and arrangement of parts, as herein described, illustrated and claimed.

In the accompanying drawings:—Figure 1 is a vertical longitudinal section through the complete engine, some of the parts being shown in elevation. Fig. 2 is an enlarged vertical diametrical section taken through the rotor and the parts immediately adjacent thereto. Fig. 3 is a cross section taken through the parts shown in Fig. 2 at right angles to the axis of the engine, showing the relation of the parts when the slidable abutments are at the inner limit of their movement. Fig. 4 is a similar view showing the relation of the parts when the slidable abutments are at the outer limit of their movement. Fig. 5 is a cross section on the line 5—5 of Fig. 1 looking in the direction of the arrow. Fig. 6 is a cross section on the line 6—6 of Fig. 1 looking in the direction of the arrow.

Referring to the drawings 1, 2 and 3 designate pedestals or pillar blocks which support the engine structure, the pedestals 1, 2 and 3 being adapted to be fastened in fixed relation to a suitable bed plate or to any supporting surface.

4 represents the rotor which is in the form of a hollow cylinder provided on the outer face thereof with lugs 5 to which a pulley rim or fly wheel 6 is shown as fastened by means of screws 7. On its inner face the rotor 4 is provided with dove-tailed recesses 8 in which are received correspondingly shaped heads 9 of abutments 10 which are thus carried by the rotor, the said abutments being secured in place by means of screws 11 or their equivalent.

Within the rotor is mounted a hollow cylindrical non-rotary member 12 against the outer periphery of which bear shoes 13 having reduced portions 14 which are received in recesses in the abutments 10, the shoes 13 being pressed snugly against the periphery of the member 12 by means of backing springs 15 thus forming a fluid tight joint between each abutment 10 and the non-rotary or stationary member 12.

The stationary member 12 is provided at intervals with guide ways 16 extending radially through the same to receive a corresponding number of slidable non-rotating abutments 17, four of such abutments being shown. It is obvious, however, that the number of abutments 10 and 14 may be increased or diminished in accordance with the desire of the manufacturer and also in accordance with the size of the engine. The rotor 4 and the non-rotary member 12 are concentric and their adjacent peripheral faces are spaced apart sufficiently to produce a combustion space 18 which is divided by the abutments into an annular series of combustion chambers in which the explosive mixture when ignited expands between the abutments 10 and 17 so as to drive the rotor 4 around the stationary member 12.

Each of the slidable abutments 17 is provided at its inner extremity with a roller 18' which is received in one of a plurality of cam ways or slots 19 in an oscillatory cam 20 the shaft 21 of which is tubular or hollow for a purpose to be hereinafter described, the shaft 21 being operated by means of a vibratory arm 22 carrying a roller 23 which traverses the cam groove 24 of a cam 25 fast on a rotary cam shaft 26.

The rotor 4 has secured to opposite sides thereof by means of screws 27 or their equivalent, heads 28 provided with sleeve like hubs 29 which revolve upon bushings 30 on the oppositely extending hub portions 31 of the non-rotary or stationary member 12, the hub portions 31 extending outwardly from stationary face plates 32 which are fastened by screws 33 or their equivalent to opposite sides of the member 12. The hub portions 31 extend through the pedestals 2 and 3 and are keyed therein as shown at 34.

Located within the center of the stationary member 12 is a mixture compressing cylinder 35 and reciprocatory piston 36, the piston being mounted on a tubular piston rod 37 which is adapted to reciprocate in the direction of its length through a bushing 38 within the hollow shaft 21 hereinabove referred to. Another bushing 39 is interposed between the sleeve like members 21 and 31 hereinabove described.

From the compressing cylinder 36, ports or passages 40 lead to compression trap chambers 41 formed in the non-rotary member 12, each of said chambers 41 being provided with a back pressure check valve 42 the stem of which is received in a guide plug 43, the check valve 42 being held yieldingly against its seat by means of a coiled expansion spring 44. Another port or passage 45 extends from the chamber 41 into the guide way of the adjacent slidable abutment 17 so that in the sliding movement of the abutment 17, the passage 45 is alternately opened and closed. Each sliding abutment 17 is formed with a passage 46 therein adapted to register with the passage 45, the passage 46 opening at its discharge end into the space 18 so as to admit the compressed mixture between the relatively movable abutments for the purpose above set forth. Immediately adjacent to each sliding abutment 17 is a spark plug 47. All of these plugs 47 are connected to a common supporting ring 48 carrying electrical contacts 49 through which an electrical current is conducted to the plugs at the proper time. The outer extremity of each of the slidable abutments 17 is recessed to receive a shoe or packing strip 50 held in place by screws 51 which serve to limit the outward movement of the strip or shoe 50, the latter being pressed outwardly by means of backing springs 52 to provide a close contact between the abutments 17 and the inner periphery of the rotor 4 to prevent leakage of the mixture at such point.

At one side of each slidable abutment 17, the stationary member 12 is formed with a recess to receive a spring pressed presser block 53 carrying a series of anti-friction balls or rollers 54 which bear directly against the adjacent side of the abutment 17 to hold the opposite side of said abutment snugly against that wall of the guide way which contains the port or passage 45 above described thereby preventing leakage of the mixture when the abutment 17 is in its inward position. 55 designates an expansion spring for pressing the presser block 53 in the direction of the slidable abutment 17. The exhaust ports are indicated at 56.

A large gear 57 is mounted fast on one of the hub portions 29 of the rotor and meshes with a pinion 58 fast on the cam shaft 26 above referred to. If there are four slidable abutments 17, the gears 57 and 58 will be so proportioned as to cause the cam shaft 36 to revolve at four times the speed of the rotor in order that said sliding abutments may be thrown outwardly and drawn inwardly to permit the abutments 10 of the rotor to pass by the same. Fast on the same shaft 26 is another cam 59 embodying a spiral cam groove 60 in which operate rollers 61 carried by the lower extremity of a swinging arm or lever 62 which is pivotally mounted at 63 on a stationary arm 64 fastened at 65 to the top of the pedestal 2. Between its ends, the lever or swinging arm 62 is provided with rollers 66 which engage a double flanged collar 67 on the tubular piston rod 37 above described. Therefore, as the arm 62 is vibrated, it carries with it the piston rod 37 and thus actuates the compressing piston 36. An expansion spring 68 bearing against the collar 67 assists in the working stroke of the piston 36, the spring 68 bearing at its opposite end against a guide bearing 69 forming an extension of the pedestal 1. Another extension arm 70 projects from the pedestal 1 and carries at its extremity an eye 71 in which is mounted a valve opening pin 72 adjustable by means of a set screw 73 to vary the amount of opening of a main inlet valve 74 movable toward and from a valve seat 75 of the compressing piston 36. The valve 74 is mounted on the extremity of a slidable stem 76 which extends lengthwise through the bore of the tubular piston rod 37 so that the opposite extremity thereof may strike against the pin 72 for the purpose of opening the valve 74, the mixture passing in through an inlet connection 77 and thence through the tubular piston rod 37 past the valve 74 into the compressing cylinder 35. 78 designates an expansion spring which acts against a collar 79 on the valve stem 76 to hold the valve 74 normally seated or closed. The stem 76 passes through a stuffing box 80 threaded on the end of the tubular piston rod 37, the spring 78 bearing at one extremity against the gland 81 of the stuffing box 80.

A compression regulating valve 82 controls a relief port 83 in one of the stationary face plates 32 and is held normally seated by means of a coiled expansion spring 84 encircling the stem 85 of the valve 82. The outer end of the stem 85 is received in a guide 86 which also forms a spring tensioning device, the guide 86 being threaded at 87 through an opening in the pedestal 3 and extending through a stuffing box 88 at the outside of said pedestal where it has fast thereon a bevel gear 89 which meshes with and is operated by another bevel gear 90 fast on a compression regulating shaft 91 adapted to be manually operated by any suitable means. Should any of the mixture get behind the piston 36, it is allowed to return to the proper side of the piston by means of a check valve 92 located within an opening 93 in the piston and held normally seated by means of a spring 94. 95 represents the entrance to a return by-pass leading back to the fuel tank so as to release any mixture or gasolene which may accumulate in the chamber 96 formed within the adjacent hub portion 31 of the non-rotary member 12.

From the foregoing description, taken in connection with the accompanying drawings, the operation of the engine will now be understood.

The member 12 containing the slidable abutments 17 is stationary and therefore the abutments 17 are non-rotary but have a sliding movement inwardly and outwardly in a direction substantially radial to the axis of the engine. By reason of the oscillatory movements of the cam 20, the slidable abutments 17 are drawn inwardly in time to permit the abutments 10 of the rotor to pass by the same. The slidable abutments are then thrust outwardly thereby opening up communication between the storage compression chambers 41 and that portion of the combustion chamber included between one of the rotor abutments and the corresponding non-rotating or slidable abutment. The ignition of the charge then causes each of the abutments 10 to be driven away from the respective abutment 17 thus producing four (more or less) impulses during each complete revolution of the rotor, the exhaust passing out through the ports 56 which may be located at any desired point in the respective combustion chambers. The construction described provides for an even torque and results in a compact and efficient motor practically free from vibration.

Having thus described my invention, I claim:—

1. In a rotary internal combustion engine, a hollow cylindrical rotor, a non-rotary cylindrical member arranged concentrically within and in peripherally spaced relation to the rotor to form a combustion chamber, abutments carried by the rotor and bearing a fixed relation to the same, a circular series of non-rotary abutments each slidable in relation to said non-rotary member and in a substantially radial direction toward and away from the inside periphery of the rotor, an oscillatory cam operating with a positive action on all of said slidable abutments to thrust the same outwardly and draw the same inwardly, an oscillatory cam shaft concentric with the rotor and means for introducing an explosive mixture in the combustion chamber between the non-rotary and rotor carried abutments.

2. In a rotary internal combustion engine, a hollow cylindrical rotor, a non-rotary cylindrical member arranged concentrically within and in peripherally spaced relation to the rotor to form an annular combustion chamber, abutments carried by the rotor and bearing a fixed relation to the same, non-rotary abutments slidable in relation to said non-rotary member and in a substantially radial direction toward and away from the inside periphery of the rotor, means operating with a positive action to thrust said slidable abutments outwardly and draw the same inwardly, and means for introducing an explosive mixture in the combustion chamber between the non-rotary and rotor carried abutments, said means comprising a compressing cylinder and piston arranged within said non-rotary cylindrical member, and valved passages leading from said cylinder outwardly to said annular combustion chamber.

3. In a rotary internal combustion engine, a hollow cylindrical rotor, a non-rotary cylindrical member arranged concentrically within and in peripherally spaced relation to the rotor to form a combustion chamber, abutments carried by the rotor and bearing a fixed relation to the same, non-rotary abutments slidable in relation to said non-rotary member and in a substantially radial direction toward and away from the inside periphery of the rotor, an oscillatory cam operating with a positive action to thrust said slidable abutments outwardly and draw the same inwardly, and means for introducing an explosive mixture in the combustion chamber between the non-rotary and rotor carried abutments, said means comprising a compressing cylinder and piston arranged within said non-rotary cylindrical member, and compression trap chambers between and in communication with said cylinder and the combustion chamber.

4. In a rotary internal combustion engine, a hollow cylindrical rotor, a non-rotary cylindrical member arranged concentrically within and in peripherally spaced relation to the rotor to form a combustion chamber, abutments carried by the rotor and bearing a fixed relation to the same, non-rotary abutments slidable in relation to said non-rotary member and in a substantially radial direction toward and away from the inside periphery of the rotor, an oscillatory cam operating with a positive action to thrust said slidable abutments outwardly and draw the same inwardly, means for introducing an explosive mixture in the combustion chamber between the non-rotary and rotor carried abutments, said slidable abutments acting as valves to control the admission of mixture to the combustion chamber, and presser blocks carrying anti-friction rollers bearing against said slidable abutments to press said blocks against the ported faces of the non-rotary member.

5. In a rotary internal combustion engine, a hollow cylindrical rotor, a non-rotary cylindrical member arranged concentrically within and in peripherally spaced relation to the rotor to form a combustion chamber, abutments carried by the rotor and bearing a fixed relation to the same, non-rotary abutments slidable in relation to said non-rotary member and in a substantially radial direction toward and away from the inside periphery of the rotor, an oscillatory cam operating with a positive action to thrust said slidable abutments outwardly and draw the same inwardly, means for introducing an explosive mixture in the combustion chamber between the non-rotary and rotor carried abutments, said means comprising a compressing cylinder and piston arranged within said non-rotary cylindrical member, valved passages leading from said cylinder to the combustion chamber, a rotary cam shaft actuated by the rotor, an arm on said oscillatory cam, and a cam on said rotary cam shaft operating to rock said arm.

In testimony whereof I affix my signature in presence of two witnesses.

JOHN L. CLARK.

Witnesses:
 EMMET E. BRIGHT,
 ROY L. BRIGHT.